(No Model.)

W. STRONG.
PIPE AND HOSE COUPLING.

No. 327,737. Patented Oct. 6, 1885.

WITNESSES:
Theodore Laughlin,
Charles Aneshaensel Jr.

INVENTOR:
William Strong,
Per James B. Lizius & Co.
Attorneys.

UNITED STATES PATENT OFFICE.

WILLIAM STRONG, OF INDIANAPOLIS, INDIANA, ASSIGNOR OF ONE-HALF TO CHARLES ANESHAENSEL, OF SAME PLACE.

PIPE AND HOSE COUPLING.

SPECIFICATION forming part of Letters Patent No. 327,737, dated October 6, 1885.

Application filed August 18, 1885. Serial No. 174,769. (No model.)

*To all whom it may concern:*

Be it known that I, WILLIAM STRONG, a citizen of the United States, residing at Indianapolis, in the county of Marion and State of Indiana, have invented certain new and useful Improvements in Pipe and Hose Couplings, of which the following is a specification.

My invention relates to improvements in couplings such as are used to connect one end of a sprinkler-hose to a water-works pipe. Such couplings, in order to allow the hose to be carried around horizontally without being twisted and kinked, had to be made in form of a swivel or a ball-and-socket joint. The great difficulty with them was to keep the same water-tight and easily-turning. The swivel-seat had to be carefully ground to make it water-tight; but the impurities of the water in a very short time made the seat sticky, so that it would hardly turn. The wrench needed to screw the coupling onto the water-pipe was liable to be broken or lost, and in many cases, on account of allowing too much leverage to the operator, formed the means to destroy the elastic washers, or the like, placed between the coupling and the water-works pipe in order to form a water-tight joint, thus causing leakage and necessitating repairs. I overcome these objections by the device illustrated in the accompanying drawings, in which—

Figure 1:
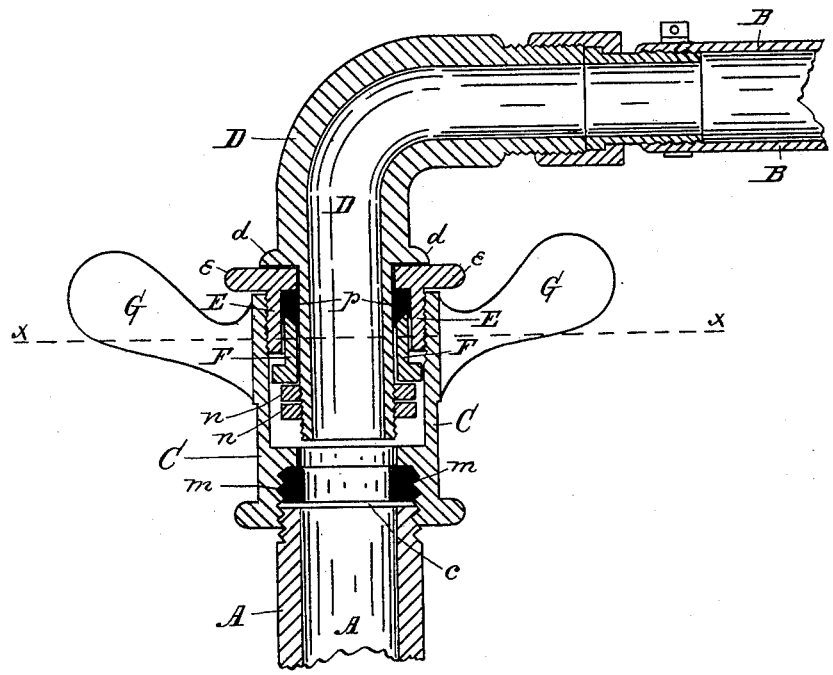
Figure 2:
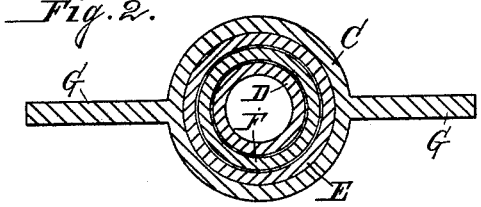

Figure 1 is a vertical cross-section through my improved pipe and hose coupling, and Fig. 2 a horizontal section through the same on line *x x* on Fig. 1.

Similar letters refer to similar parts throughout the several views.

A is the vertical water-works pipe; B, the sprinkler-hose. My improved coupling, connecting the pipe A and the sprinkler-hose B, is constructed in the following manner:

A vertical cylindrical sleeve, C, is provided at its lower part with or terminates in a socket, *c*, screw-threaded on its inside to receive the end of the vertical water-pipe A. Elastic washers *m m* are inserted into this socket *c* to form a water-tight joint between the pipe A and the sleeve C. Into the sleeve C from above is inserted the vertical pipe D, which pipe, above the sleeve C, branches off in a horizontal direction, terminating in a screw-thread, so that a horizontal connection between the hose B and the pipe D is obtained. Instead of this quarter-bent or simple elbow, a globe-elbow can be made in the pipe D, the object to be kept in view always being to give the necessary strength to the pipe D at the elbow-point in order to avoid breakage there. That portion of the pipe D which extends into the sleeve C is considerably smaller in diameter than the inner diameter of the sleeve C, to allow of the insertion of the following water-tight packing device between said sleeve C and the pipe D. A collar, E, screw-threaded on its outside, screws down into the sleeve C, leaving a space all around between its inner surface and the pipe D for the elastic packing. This collar E is provided on top with a circular flange, *e*, that extends outward over the upper rim of the sleeve and projects inward far enough to snugly encircle the pipe D and to form a seat for the elastic water-tight packing *p*, which is held up against the flange *e* by the collar F. This collar F is slipped from below over the end of the pipe D into the space between the pipe D and the above-described outer collar, E, and terminates against the elastic packing *p*.

To keep the collar F in its proper position against the packing *p*, and to hold the pipe D in place in the sleeve C, nuts *n n* are screwed up over the end of the pipe D tight against the under side of the collar F, or a pin, bolt, or any other suitable means may be used to accomplish the same purpose.

The pipe D is prevented from slipping too far into the collar E and the sleeve C by a flange, *d*, forming part of the pipe D and resting on the circular top flange, *e*, of the collar E.

When the water is turned onto the pipe A, the pressure of the water acting against the elbow-neck in the pipe D forces said pipe D and the collar F up against the elastic packing *p*, making leakage when the supply is turned on impossible, for the stronger the pressure the more water-tight the packing-joint. The pipe D turns easily in its socket formed by the collars F E and the sleeve C, the same forming a guiding-chamber and preventing any twisting of the pipe.

To enable the operator to screw the coupling onto the water-pipe A without using a wrench or the like, one or more handles or arms, G G, are cast onto the circular sleeve C, projecting outward and forming ready means to screw the coupling onto the water-pipe.

Having thus fully described my improvements, what I claim, and desire to secure by Letters Patent, is—

A pipe and hose coupling having a vertical cylindrical sleeve, C, provided with a screw-threaded socket, $c$, to receive the end of the water-pipe A, the pipe D, starting and turning in the sleeve C, branching off horizontally above the sleeve, and connecting with the hose B, the shoulder $d$ on said pipe D, the collar E, screwed from above into the sleeve C and being provided with the circular flange $e$, as described, the inner collar, F, the elastic packing $p$, and the nuts or locking device $n\,n$, forming means to secure a water-tight joint where the pipe D passes through and operates in the flange $e$ of the collar E, the handles or arms G G, secured to the sleeve C for the purpose specified, all arranged and constructed as described, and for the purpose specified.

In testimony whereof I have signed my name to this specification in the presence of two subscribing witnesses.

WILLIAM STRONG.

Witnesses:
 THEODORE LANGBEIN,
 CHARLES ANESHAENSEL, Jr.